United States Patent
Das et al.

(10) Patent No.: US 12,335,939 B2
(45) Date of Patent: Jun. 17, 2025

(54) SWITCHING TO MINI-SLOTS FOR TRANSMISSION OF URGENT DATA

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Kallol Das, Pijnacker (NL); Remco Litjens, Voorschoten (NL); Wieger IJntema, Rotterdam (NL); Haibin Zhang, Voorburg (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 484 days.

(21) Appl. No.: 17/779,641

(22) PCT Filed: Dec. 18, 2020

(86) PCT No.: PCT/EP2020/087085
§ 371 (c)(1),
(2) Date: May 25, 2022

(87) PCT Pub. No.: WO2021/123211
PCT Pub. Date: Jun. 24, 2021

(65) Prior Publication Data
US 2023/0345450 A1 Oct. 26, 2023

(30) Foreign Application Priority Data
Dec. 20, 2019 (EP) .................................... 19218400

(51) Int. Cl.
*H04W 72/12* (2023.01)
*H04W 72/121* (2023.01)

(52) U.S. Cl.
CPC ................................ *H04W 72/121* (2013.01)

(58) Field of Classification Search
CPC ........... H04W 72/0446; H04W 72/121; H04W 72/569; H04W 72/1268; H04W 72/12
See application file for complete search history.

(56) References Cited

U.S. PATENT DOCUMENTS

2008/0189381 A1   8/2008  Poirier
2009/0060108 A1*  3/2009  Hafuka .................. H04L 7/042
                                              375/371

(Continued)

FOREIGN PATENT DOCUMENTS

EP    2 408 234 A1   1/2012
EP    2 770 798 B1   3/2018

(Continued)

OTHER PUBLICATIONS

ETSI EN 302.663 V1.1.2, Intelligent Transport Systems (ITS); Access Layer Specification for Intelligent Transport Systems Operating in the 5 GHz frequency band, (May 2015).

(Continued)

*Primary Examiner* — Anez C Ebrahim
(74) *Attorney, Agent, or Firm* — Hamilton, Brook, Smith & Reynolds, P.C.

(57) ABSTRACT

A first method comprises transmitting data (83) of a first kind during a first part of a first time slot (ti1) of a plurality of time slots (ti1-ti4) of equal length according to a regular slot schedule, transmitting a preamble (84) in a second part of the first time slot, and transmitting data of the second kind during one or more mini-slots of a first part of a second time slot (ti2) of the time slots according to a mini-slot schedule. The second time slot succeeds the first time slot and the first part of the second time slot comprises a plurality of mini-slots (85). A second method comprises receiving the data of the first kind during the first part of the first time slot, (Continued)

receiving the preamble in the first time slot, and receiving data during a plurality of the mini-slots of the second time slot.

17 Claims, 7 Drawing Sheets

(56) References Cited

U.S. PATENT DOCUMENTS

| | | | |
|---|---|---|---|
| 2010/0278123 A1* | 11/2010 | Fong | H04L 5/0007 370/329 |
| 2010/0302947 A1 | 12/2010 | Leppanen | |
| 2011/0258327 A1 | 10/2011 | Phan et al. | |
| 2011/0268004 A1 | 11/2011 | Doppler | |
| 2012/0077510 A1 | 3/2012 | Chen | |
| 2012/0290650 A1 | 11/2012 | Montuno et al. | |
| 2013/0170398 A1 | 7/2013 | Kwon | |
| 2014/0022986 A1 | 1/2014 | Wu et al. | |
| 2014/0064147 A1 | 3/2014 | Wang | |
| 2014/0094183 A1 | 4/2014 | Gao | |
| 2017/0366311 A1* | 12/2017 | Iyer | H04B 7/0482 |
| 2019/0166599 A1* | 5/2019 | Karaki | H04W 72/1268 |
| 2019/0281627 A1* | 9/2019 | Malkov | H04W 74/085 |

FOREIGN PATENT DOCUMENTS

| | | |
|---|---|---|
| EP | 2 939 484 B1 | 5/2018 |
| WO | WO 2007/146982 A2 | 12/2007 |
| WO | WO 2012/114161 A1 | 8/2012 |
| WO | WO 2012/152224 A1 | 11/2012 |
| WO | WO 2018/129325 A1 | 7/2018 |
| WO | WO 2018/142376 A1 | 8/2018 |

OTHER PUBLICATIONS

Zhou, Z., et al., "Resource Allocation for Uplink Grant-Free Ultra-Reliable and Low Latency Communications," IEEE, (2018).
Li, Y., et al., "A Cluster-based Routing Method for D2D Communication Oriented to Vehicular Networks," IEEE International Conference on Systems, Man, and Cybernetics (SMC) Oct. 5-8, 2017.
Pocovi, G., et al., "Achieving Ultra-Reliable Low Latency Communications: Challenges and Envisioned System Enhancements," IEEE Network (2018).
$3^{rd}$ Generation Partnership Project: Technical Specification Group SA: Feasibility Study for Proximity Services (ProSe) (Release 12), Global System for Mobile Communications, 3GPP TR 22.803 V0.2.0, pp. 1-18 (Feb. 2012).
Technical White Paper: "Long Term Evolution (LTE): A Technical Review," pp. 1-15. No date given.
Fodor, G., et al., "Design Aspects of Network Assisted Device-to-Device Communications," *IEEE Communications Magazine*, pp. 170-177 (Mar. 2012).
Koskela, Timo et al., "Clustering Concept Using Device-to-Device Communication in Cellular System", Wireless Communications and Networking Conference (WCNC), 2010 IEEE, Apr. 18, 2010, pp. 1-6.
Yang, et al., "Reliable Multicasting for Device-to-Device Radio Underlaying Cellular Networks," Cornell University Library, http://arxiv.org/abs/1008.374V1 a Leader in Charge (LIC), Aug. 23, 2010, pp. 9 pages.
Seppala, J., et al. "Network Controlled Device-to-Device Radio Underlaying Cellular Multicast Concept for LTE and LTE-A Networks," IEEE WCNC, 2011, pp. 986-991.
Partial European Search Report for European Application No. EP 19218400.0, titled: Switching to Mini-Slots for Transmission of Urgent Data, Dated: Jun. 2, 2020.
European Search Report for European Application No. EP 19218400.0, titled: Switching to Mini-Slots for Transmission of Urgent Data, Dated: Sep. 2, 2020.
International Search Report and Written Opinion for Int'l Application No. PCT/EP2020/087085, titled: Switching to Mini-Slots for Transmission of Urgent Data, Dated: Jul. 6, 2021.
Intel Corporation: "Uplink Multiplexing of eMBB and URLLC Transmissions," 3GPP Draft; R1-1700377 Intel—UL_URLLC_EMBB, $3^{rd}$ Generation Partnership Project (3GPP), Mobile Competence Centre; 650, Route Des Lucioles; F-06921 Sophia-Antipolis Cedex, France, vol. RAN WG1, No. Spokane, USA (Jan. 16, 2017).
"$3^{rd}$ Generation Partnership Project: Technical Specification Group Radio Access Network; NR; NR and NG-RAN Overall Description; Stage 2 (Release 15)," 3GPP Draft, 38300-F70, $3^{rd}$ Generation Partnership Project (DGPP), Mobile Competence Centre, 650, Route Des Lucioles, F-06921 Sophia-Antipolis Cedex, France, Retrieved from Internet at: URL:https://ftp.3gpp.org/3guInternal/3GPP_ultimate_versions_to_be_transposed/sentToDpc/38300-f70.zip , Retrieved on: Sep. 26, 2019.

* cited by examiner

SWITCHING TO MINI-SLOTS FOR TRANSMISSION OF URGENT DATA

This application is the U.S. National Stage of International Application No. PCT/EP2020/087085, filed on Dec. 18, 2020, which designates the U.S., published in English, and claims priority under 35 U.S.C. § 119 or 365(c) to European Application No. 19218400.0, filed on Dec. 20, 2019. The entire teachings of the above applications are incorporated herein by reference.

FIELD OF THE INVENTION

The invention relates to a device for transmitting data of a first kind, e.g. non-urgent data, and data of a second kind, e.g. urgent data, a device for receiving data of a first kind and data of a second kind, and a device for transmitting a slot schedule.

The invention further relates to a method of transmitting data of a first kind and data of a second kind, a method of receiving data of a first kind and data of a second kind, and a method of transmitting a slot schedule.

The invention also relates to a computer program product enabling a computer system to perform any one of such methods.

BACKGROUND OF THE INVENTION

Future automotive applications will be dominated by (semi-)autonomously driving vehicles that require reliable and real-time vehicle-to-vehicle (V2V) communications. In order to optimize communication resource utilization, network scalability and message transfer latency, messages are exchanged, either with a unicast or multicast purpose, in a device-to-device (D2D) fashion. Examples of information that needs to be exchanged for the autonomous operation of these vehicles are velocity, de/accelerations, current lane, lane changes and breaking actions. Some of these messages are regular/periodic while other messages may be incidental and urgent, e.g. in case of sudden braking.

Different vehicles can exchange messages as long as they utilize a common spectrum. State of the art solutions for vehicular communications such as ITS-G5 based systems utilize the unlicensed 5 GHz ITS spectrum band for communication. Such systems rely on broadcast messages over a shared spectrum, which is not a reliable and fast enough approach to exchange time-critical messages (e.g. sudden breaking, etc.) in a congested environment.

"Achieving Ultra-Reliable Low Latency Communications: Challenges and Envisioned System Enhancements", G. Pocovi, et. al., IEEE Network, March/April 2018, discloses recent 3GPP improvements for low latency in Release 15 for 5G (NR). These improvements include time slots shorter than 1 ms (e.g. mini time-slots of 0.125 ms), reducing the HARQ round trip time for the retransmissions, pre-emptive resource allocation when multiplexing eMBB and URLLC data. These improvements are addressing the user plane data transfer when the UE (User Equipment) is in connected mode and communicating with the gNB.

However, use of the above improvements when there are no dedicated radio resources given to the UE for uplink transmission does not result in low-latency communications in congested environments.

SUMMARY OF THE INVENTION

It is a first object of the invention to provide a device for transmitting data of a first kind and data of a second kind, which can be used to provide low-latency communications in a congested environment.

It is a second object of the invention to provide a device for receiving data of a first kind and data of a second kind, which can be used to provide low-latency communications in a congested environment.

It is a third object of the invention to provide a device for transmitting a slot schedule, which can be used to provide low-latency communications in a congested environment.

It is a fourth object of the invention to provide a method of transmitting data of a first kind and data of a second kind, which can be used to provide low-latency communications in a congested environment.

It is a fifth object of the invention to provide a method of receiving data of a first kind and data of a second kind, which can be used to provide low-latency communications in a congested environment.

It is a sixth object of the invention to provide a method of transmitting a slot schedule, which can be used to provide low-latency communications in a congested environment.

In a first aspect of the invention, a device for transmitting data of a first kind and data of a second kind comprises at least one receiver, at least one transmitter, and at least one processor configured to use said at least one receiver to receive a regular slot schedule and a mini-slot schedule, use said at least one transmitter to transmit data of said first kind during a first part of a first time slot of a plurality of time slots of equal length according to said regular slot schedule, use said at least one transmitter to transmit a preamble in a second part of said first time slot, and use said at least one transmitter to transmit data of said second kind during one or more mini-slots of a first part of a second time slot of said plurality of time slots according to said mini-slot schedule, said second time slot succeeding said first time slot and said first part of said second time slot comprising a plurality of mini-slots. Said data of said first kind may comprise non-urgent data and said data of said second kind may comprise urgent data.

Although certain devices, e.g. UEs, may be configured to transmit only urgent data, many devices will want to transmit both urgent data and non-urgent data. In order to optimally use the available frequency resources, the device uses the regular transmission schedule and transmission slot length for transmitting non-urgent data, but switches to a mini-slot mode which has an 'urgent transmission schedule' and shorter transmission slots for transmitting urgent data. Before switching to mini-slot mode, the device broadcasts a preamble to let other devices know that they should refrain from transmitting non-urgent data in the next time slot in the frequency resources where the urgent data will be transmitted and switch to reception in mini-slot mode in the next time slot as well.

These other devices may not need to know which device transmits in which mini-slot, e.g. because they can derive this information from the decoded packets, but knowing that data will be transmitted in mini-slots and knowing the length of the mini-slots allows these other devices to decode the urgent data transmitted in the first part of the second time slot more efficiently, as e.g. no unnecessary CRC checks need to be performed to determine that transmission is occurring in a regular time slot rather than in mini-slots. Furthermore, if the other devices know which device transmits in which mini-slot, they may be able to wake up selectively during the mini-slots in which they expect data. The use of mini-slot mode in combination with the transmission of the preamble, allows urgent data to be transmitted with low latency, even in congested environments. The use of short transmission slots all the time, i.e. even for non-urgent data, would cause a substantially lower transmission efficiency, as e.g. the use of mini-slots of ¼$^{th}$ the length of a regular time slot requires four headers and four CRC fields instead of one header and one CRC field.

LTE also uses the concept of "slots". In LTE, one subframe consists of two slots and corresponds to a Transmission Time Interval (TTI). The term "time slot" used in this specification may be an LTE slot or an LTE subframe, for example. Said at least one processor may be configured to transmit said data of said first kind during more than half of said first time slot.

Said at least one processor may be configured to concurrently transmit said preamble in said second part of said first time slot on two different frequency resources, said two different frequency resources having different carrier frequencies. This allows the device that transmits data on one frequency carrier to immediately after transmitting this data start listening for preambles announcing urgent data transmitted by other devices on another frequency carrier. This is beneficial if the device can concurrently transmit on one carrier and listen on another carrier, but not concurrently transmit and listen on the same carrier (as is often the case), because it typically takes some time to switch from transmission mode to listening mode. The decision on which frequency resource the urgent data is transmitted by a particular UE is normally either instructed by the base station or cluster head or pre-coded in the SIM card of the UE.

A first one of said two different frequency resources may be used exclusively by one mobile network operator and a second one of said two different frequency resources may be shared by multiple mobile network operators. The aforementioned (semi-)autonomously driving vehicles are typically equipped with a 4/5G cellular communications device (UE; User Equipment) and a SIM (Subscriber Identity Module) card associated with a subscription to one of many different mobile network operators, each with their own licensed spectrum. The different operators would most likely support the afore-mentioned automotive application through their own licensed spectrum. A shared/common channel (either licensed or unlicensed) that allows communication between the users of different operators would then be required. This shared/common channel can be used to transmit preambles and to allow devices to immediately after transmitting data start listening for preambles transmitted by other devices. This shared/common channel can also be used to exchange regular slot schedules and/or mini-slot schedules. Given the high cost of spectrum licensing, the bandwidth of the licensed shared spectrum will likely be very limited thus only control/management messages would be exchanged over this spectrum while the actual communication/data exchange will take place on the licensed spectrum that is not shared. Furthermore, shared spectrum typically uses contention-based communication protocols which are not suitable for reliable transmission of data due to collisions of transmissions.

Said at least one processor may be configured to wait during at least a guard interval after transmitting said data of said first kind before transmitting said preamble. The guard interval allows the device to listen for preambles transmitted by other devices on a frequency resource with the same carrier frequency as the frequency resource on which the device has just transmitted its data. In this case, it is not necessary to concurrently transmit the preamble in two different frequency resources having different carrier frequencies.

Additionally or alternatively, there may be a further guard interval following the preamble. The further guard interval helps the other devices to process the preamble and decide whether to transmit or not in the next time slot.

Said at least one processor may be configured to transmit said preamble on a different frequency resource than a frequency resource used by said at least one processor to transmit said data of said second kind on and said preamble transmitted on said different frequency resource may identify said frequency resource used by said at least one processor to transmit said data of said second kind on. This informs devices receiving the preamble on which frequency resource the device will transmit its urgent data in the next time slot and allows these devices to refrain from transmitting on this frequency resource in the next time slot and/or receive the urgent data transmitted in the mini-slots of the next time slot on this frequency resource.

Said at least one processor may be configured to use said at least one receiver to receive further data of said second kind from one or more further devices during one or more further mini-slots of said first part of said second time slot on a frequency resource used by said at least one processor to transmit said data of said second kind. Regularly, multiple devices have urgent data to transmit at the same time, e.g. in case of simultaneous braking and/or when a (near) collision occurs. In this situation, one or more other mini-slots will be allocated to at least one other device. In certain situations, the data transmitted by the other devices, i.e. the further data, is of interest to the device and the device will thus want to receive this further data.

Said one or more mini-slots may be exclusively allocated to said device. Such an allocation may be made if the number of devices that transmits on a frequency resource is equal to or smaller than the number of available mini-slots. The length (i.e. duration) of the available mini-slots may be e.g. ⅛$^{th}$, ¼$^{th}$ or half of a regular time slot (or of the part for transmitting user data thereof), for example. The length and number of available mini-slots may be standardized. The device that makes the mini-slot allocation may be able to choose the number of available mini-slots from a plurality of pre-defined choices, e.g. increase the number of available mini-slots (up to a certain maximum), in dependence on a count of devices that need to transmit on the frequency resource.

Said at least one processor may be configured to use said at least one transmitter to transmit data of said second kind over multiple mini-slots of said first part of said second time slot. By transmitting urgent data over multiple mini-slots, a higher throughput may be achieved. This is beneficial if multiple mini-slots are allocated to a single device and the urgent data from this device does not fit into one mini-slot. Such an allocation may be made if the number of devices that transmits on a frequency resource is smaller than the number of mini-slots.

Said at least one processor may be configured to transmit said data of said second kind a first time in a first one of said mini-slots and one or more further times in one or more further ones of said mini-slots. Such a duplication of the data of the second kind in multiple mini-slots increases the reliability of the transmission and may be used when the number of devices that transmits on a frequency resource is smaller than the number of mini-slots.

The above duplication of the data of the second kind in multiple mini-slots is also beneficial if the number of devices that transmits on a frequency resource is larger than the number of mini-slots, which results in a mini-slot allocation in which each mini-slot is allocated to multiple devices. In this case, the duplication is (also) used to increase the correct reception of the second kind of data when two devices are transmitting simultaneously in the same mini-slot but there is no transmission overlap of the duplicated data transmitted in another mini-slot.

Said at least one processor may be configured to receive said regular slot schedule and said mini-schedule from a base station or a cluster head. Typically, not only transmission of urgent data in the mini-slots is coordinated, but also transmission of the non-urgent data in the time slots is coordinated to avoid collisions of transmissions and a fair allocation of resources. This allocation may be made by a base station, e.g. in an 'in coverage' scenario, but may alternatively be made by a cluster head. This cluster head may be elected from the devices in a cluster. For multiple reasons, including (i) the general local relevance of messages, (ii) scalability, and (iii) the devices' limited transmission powers, vehicles are typically grouped into so-called clusters, within which messages are exchanged and the associated transmissions are coordinated.

Said at least one processor may be configured to transmit said data of said second kind on a first frequency resource, said first frequency resource being used exclusively by a first mobile network operator, and receive other data on another frequency resource, said other frequency resource being used exclusively by a second mobile network operator. A cluster of vehicles typically comprises vehicles that use different mobile network operators and the vehicles typically need to be able to receive data transmitted by all vehicles in the cluster and therefore also on frequency resources used exclusively by other mobile network operators. Thus, the device will also need to receive data on frequency resources used exclusively by other mobile network operators than its own and even receive in mini-slot mode after receiving a relevant preamble, e.g. on these frequency resources or on a shared frequency resource. As mentioned above, given the high cost of spectrum licensing, the bandwidth of the shared licensed spectrum will likely be very limited thus only control/management messages would be exchanged over this spectrum while the actual communication/data exchange will take place on the licensed spectrum that is not shared, and the shared unlicensed spectrum normally lacks the required transmission reliability.

Said at least one processor may be configured to use said at least one receiver to receive a preamble assignment, said preamble assignment assigning said preamble to said device, said preamble being selecting from a plurality of orthogonal preambles. The use of orthogonal preambles allows different devices to concurrently transmit preambles in the same time slot on the same frequency resource while all preambles are still being received properly.

Said preamble may indicate that data transmitted in the next time slot requires urgent reception by one or more recipients of said data. For example, the preamble may be an URLLC flag and/or may be transmitted in a time slot reserved specifically for URLLC preambles. URLLC stands for Ultra Reliable Low Latency Communication. URLLC features are specified in 3GPP Release 15 5G-NR and later. Urgent data is also referred to as URLLC data in this specification. The preamble may be standardized, e.g. in a 3GPP standard. Preferably, said preamble consumes 15% or less of a time slot. This is typically sufficient to communicate the intent to transmit urgent data and leaves sufficient time to transmit the data (payload) itself.

In a second aspect of the invention, a device for receiving data of a first kind and data of a second kind comprises at least one receiver and at least one processor configured to use said at least one receiver to receive a regular slot schedule and a mini-slot schedule, use said at least one receiver to receive data of said first kind during a first part of a first time slot of a plurality of time slots of equal length according to said regular slot schedule, use said at least one receiver to receive a preamble in a second part of said first time slot, and use said at least one receiver to receive data during a plurality of mini-slots of a first part of a second time slot of said plurality of time slots according to said mini-slot schedule, said second time slot succeeding said first time slot. The length of the available mini-slots may be e.g. $\frac{1}{8}^{th}$, $\frac{1}{4}^{th}$ or half of a regular time slot (or of the part for transmitting user data thereof), for example.

In a third aspect of the invention, a device for transmitting a slot schedule comprises at least one receiver, at least one transmitter, and at least one processor configured to use said at least one receiver to receive information from a plurality of further devices, determine a regular slot schedule in which one or more time slots are allocated to a plurality of devices for transmission of data of a first kind on a frequency resource, said plurality of devices comprising said plurality of further devices, determine a mini-slot schedule in which one or more mini-slots of a time slot are allocated to each of said plurality of devices for transmission of data of a second kind on said frequency resource, said time slot comprising a plurality of mini-slots, and use said at least one transmitter to transmit said regular slot schedule and said mini-slot schedule to each of said plurality of further devices. This device for transmitting a slot schedule may allocate one or more time slots to itself.

Said at least one processor may be configured to determine whether a count of said plurality of devices exceeds a threshold, allocate one or more of said plurality of mini-slots to each of said plurality of devices upon determining that said count does not exceed said threshold, each of said plurality of mini-slots being allocated to only one device, and allocate multiple of said plurality of mini-slots to each of said plurality of devices upon determining that said count exceeds said threshold, each of said plurality of mini-slots being allocated to multiple devices.

In a fourth aspect of the invention, a method of transmitting data of a first kind and data of a second kind comprises receiving a regular slot schedule and a mini-slot schedule, transmitting data of said first kind during a first part of a first time slot of a plurality of time slots of equal length according to said regular slot schedule, transmitting a preamble in a second part of said first time slot, and transmitting data of said second kind during one or more mini-slots of a first part of a second time slot of said plurality of time slots according to said mini-slot schedule, said second time slot succeeding said first time slot and said first part of said second time slot comprising a plurality of mini-slots. Said method may be performed by software running on a programmable device. This software may be provided as a computer program product.

In a fifth aspect of the invention, a method of receiving data of a first kind and data of a second kind comprises receiving a regular slot schedule and a mini-slot schedule, receiving data of said first kind during a first part of a first time slot of a plurality of time slots of equal length according to said regular slot schedule, in said first time slot, and receiving data during a plurality of mini-slots of a first part of a second time slot of said plurality of time slots according to said mini-slot schedule, said second time slot succeeding said first time slot. Said method may be performed by software running on a programmable device. This software may be provided as a computer program product.

In a sixth aspect of the invention, a method of transmitting a slot schedule comprises receiving information from a plurality of further devices, determining a regular slot schedule in which one or more time slots are allocated to a plurality of devices for transmission of data of a first kind on a frequency resource, said plurality of devices comprising said plurality of further devices, determining a mini-slot schedule in which one or more mini-slots of a time slot are allocated to each of said plurality of devices for transmission of data of a second kind on said frequency resource, said time slot comprising a plurality of mini-slots, and transmitting said regular slot schedule and said mini-slot schedule to each of said plurality of further devices. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving a regular slot schedule and a mini-slot schedule, transmitting data of said first kind during a first part of a first time slot of a plurality of time slots of equal length according to said regular slot schedule, transmitting a preamble in a second part of said first time slot, and transmitting data of said second kind during one or more mini-slots of a first part of a second time slot of said plurality of time slots according to said mini-slot schedule, said second time slot succeeding said first time slot and said first part of said second time slot comprising a plurality of mini-slots.

A non-transitory computer-readable storage medium stores at least a second software code portion, the second software code portion, when executed or processed by a computer, being configured to perform executable operations comprising: receiving a regular slot schedule and a mini-slot schedule, receiving data of said first kind during a first part of a first time slot of a plurality of time slots of equal length according to said regular slot schedule, receiving a preamble in said first time slot, and receiving data during a plurality of mini-slots of a first part of a second time slot of said plurality of time slots according to said mini-slot schedule, said second time slot succeeding said first time slot. Another preamble may be received in the second time slot with respect to the time slot succeeding the second time slot.

A non-transitory computer-readable storage medium stores at least a third software code portion, the third software code portion, when executed or processed by a computer, being configured to perform executable operations comprising: receiving information from a plurality of further devices, determining a regular slot schedule in which one or more time slots are allocated to a plurality of devices for transmission of data of a first kind on a frequency resource, said plurality of devices comprising said plurality of further devices, determining a mini-slot schedule in which one or more mini-slots of a time slot are allocated to each of said plurality of devices for transmission of data of a second kind on said frequency resource, said time slot comprising a plurality of mini-slots, and transmitting said regular slot schedule and said mini-slot schedule to each of said plurality of further devices.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions.

These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
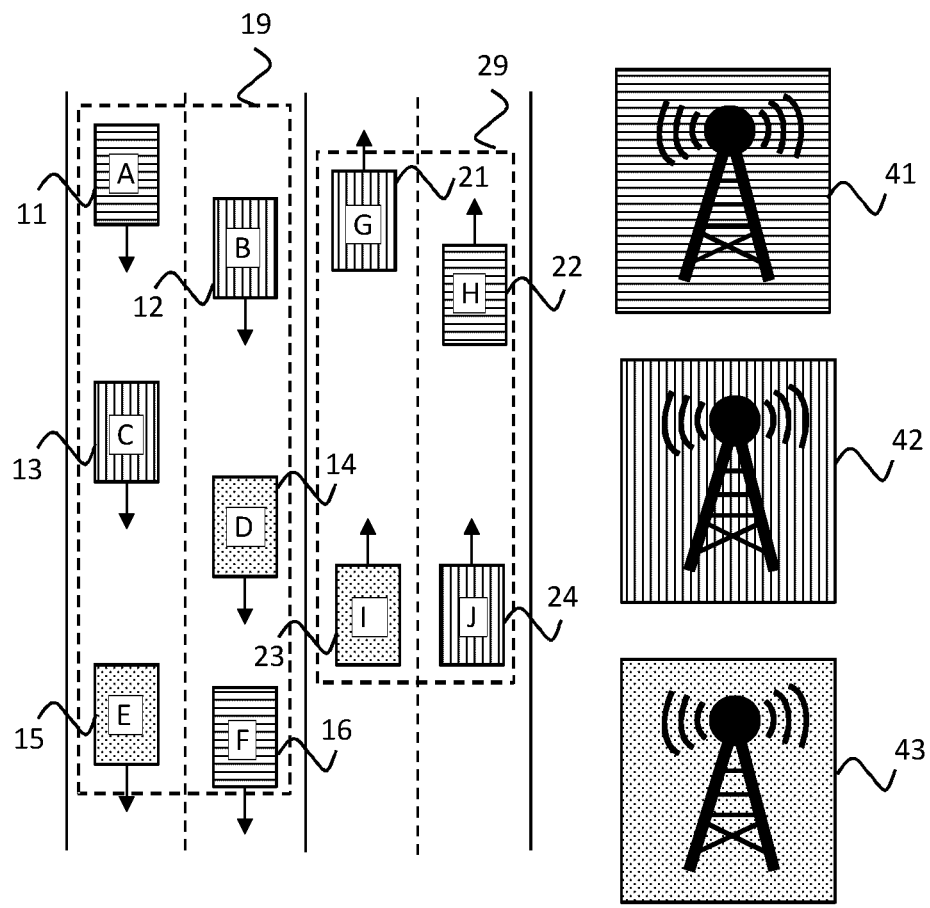
FIG. 1 depicts an example scenario in which vehicles have been clustered for vehicle-to-vehicle communication.

FIG. 1 depicts an example scenario of six southbound vehicles 11-16 (labelled A-F) and four northbound vehicles 21-24 (labelled G-J) with subscriptions to three different mobile network operators. The vehicles 11-16 and 21-24 are referred to as (examples of) User Equipment (UEs) in this description. The vehicles 11, 16 and 22 communicate with a base station 41 of a first mobile network operator. The vehicles 12, 13, 21 and 24 communicate with a base station 42 of a second mobile network operator. The vehicles 14, 15 and 23 communicate with a base station 43 of a third mobile network operator.

Vehicles send messages to each other, e.g. to inform each other of detected traffic situations and/or of performed and/or intended actions. For multiple reasons, including (i) the general local relevance of messages; (ii) scalability; and (iii) the UEs' limited transmission powers, vehicles are grouped into so-called clusters, within which messages are exchanged and the associated transmissions are coordinated. In order to optimize communication resource utilization, network scalability and message transfer latency, messages are exchanged, either with a unicast or multicast purpose, in a device-to-device (D2D) fashion.

In the example of FIG. 1, vehicles 11-16 have been clustered into a cluster 19 and vehicles 21-24 have been clustered into a cluster 29.

A number of steps can be identified related to the grouping of cars and the coordination of message transmissions in the cluster:

1. Discovery phase in which the different vehicles detect each other's presence and proximity.
2. Cluster formation (or cluster update) in which (a subset of) the vehicles that have established each other's proximity in the discovery phase jointly establish a vehicle cluster.
3. Definition and signaling of regular slot schedule phase for intra-cluster communication in which a regular slot schedule is created by: a) the associated cellular base station when the cluster members are 'in coverage' scenario of a particular operator; or b) an elected cluster head when the cluster members are (partially) 'out of coverage' scenario of any particular operator.

Cluster formation may be performed, for example, in the manner disclosed in "A cluster-based routing method for D2D communication oriented to vehicular networks" by Y. Li, H. X. Z. Gai, X. Que and X. S. a. J. Riekki, published in 2017 IEEE International Conference on Systems, Man, and Cybernetics (SMC), Banff, A B, 2017.

Thus, given an established vehicle cluster (by following steps 1-2 mentioned above), a regular slot schedule may be created by the associated cellular base station ('in coverage' scenario) or by an elected cluster head ('out of coverage' scenario). The regular slot schedule indicates in each time slot which UEs (vehicles) may transmit, whereby each UE needs to convey its messages in the operator-specific D2D carrier and hence all other UEs (including the ones belonging to other operators) in the cluster will need to listen to that frequency. This way, all transmissions (with the exception of control signaling on a shared control channel, if used) take place on the UEs' 'subscribed spectrum', implying fair usage of licensed resources.

Figure 2:
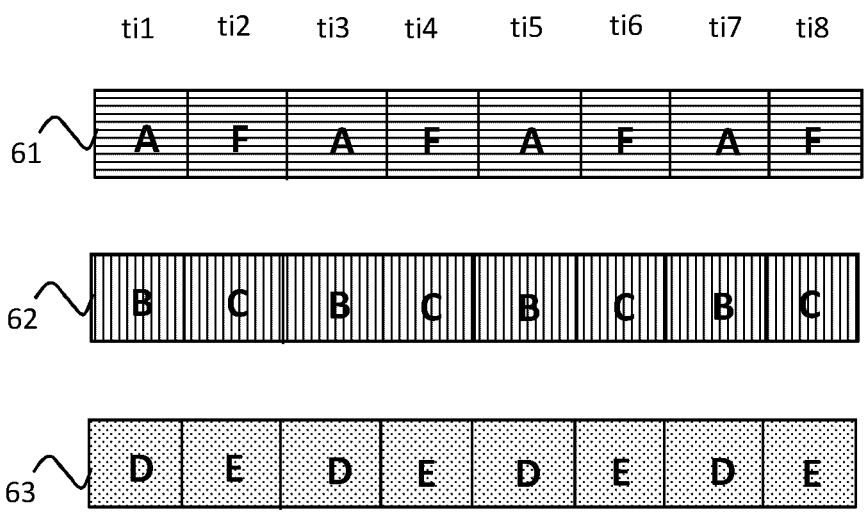
FIG. 2 shows examples of regular slot schedules.

FIG. 2 shows examples of regular slot schedules for three operator-specific D2D channels (frequency resources/carriers) 61-63 used by the three operators described in relation to FIG. 1. In FIG. 2, eight time slots ti1-ti8 are represented. Vehicles 11 and 16 (labelled A and F, respectively) transmit on D2D channel 61 of the first operator, as instructed/coordinated by base station 41 of FIG. 1. Vehicles 12 and 13 (labelled B and C, respectively) transmit on D2D channel 62 of the second operator, as instructed/coordinated by base station 42 of FIG. 1. Vehicles 14 and 15 (labelled D and E, respectively) transmit on D2D channel 63 of the third operator, as instructed/coordinated by base station 43 of FIG. 1.

Each of the three regular slot schedules is operator and frequency specific. The first operator makes the regular slot schedule for vehicles 11 and 16 (labelled A and F) on D2D channel 61 and signals this via base station 41. This regular slot schedule is independent from the regular slot schedules made by the other operators and signalled via the base stations 42 and 43. The vehicles 12, 13, 14 and 15 (labelled B-E) may receive the regular slot schedule made by the first operator for D2D channel 61 via a shared (unlicensed) channel, e.g. when the cluster is formed and at regular intervals after the cluster has been formed. Similarly, the vehicles 11, 14, 15 and 16 (labelled A, D-F) may receive the regular slot schedule made by the second operator for D2D channel 62 via the shared (unlicensed) channel and the vehicles 11, 12, 13 and 16 (labelled A-C, F) may receive the regular slot schedule made by the third operator for D2D channel 63 via the shared (unlicensed) channel.

Figure 3:
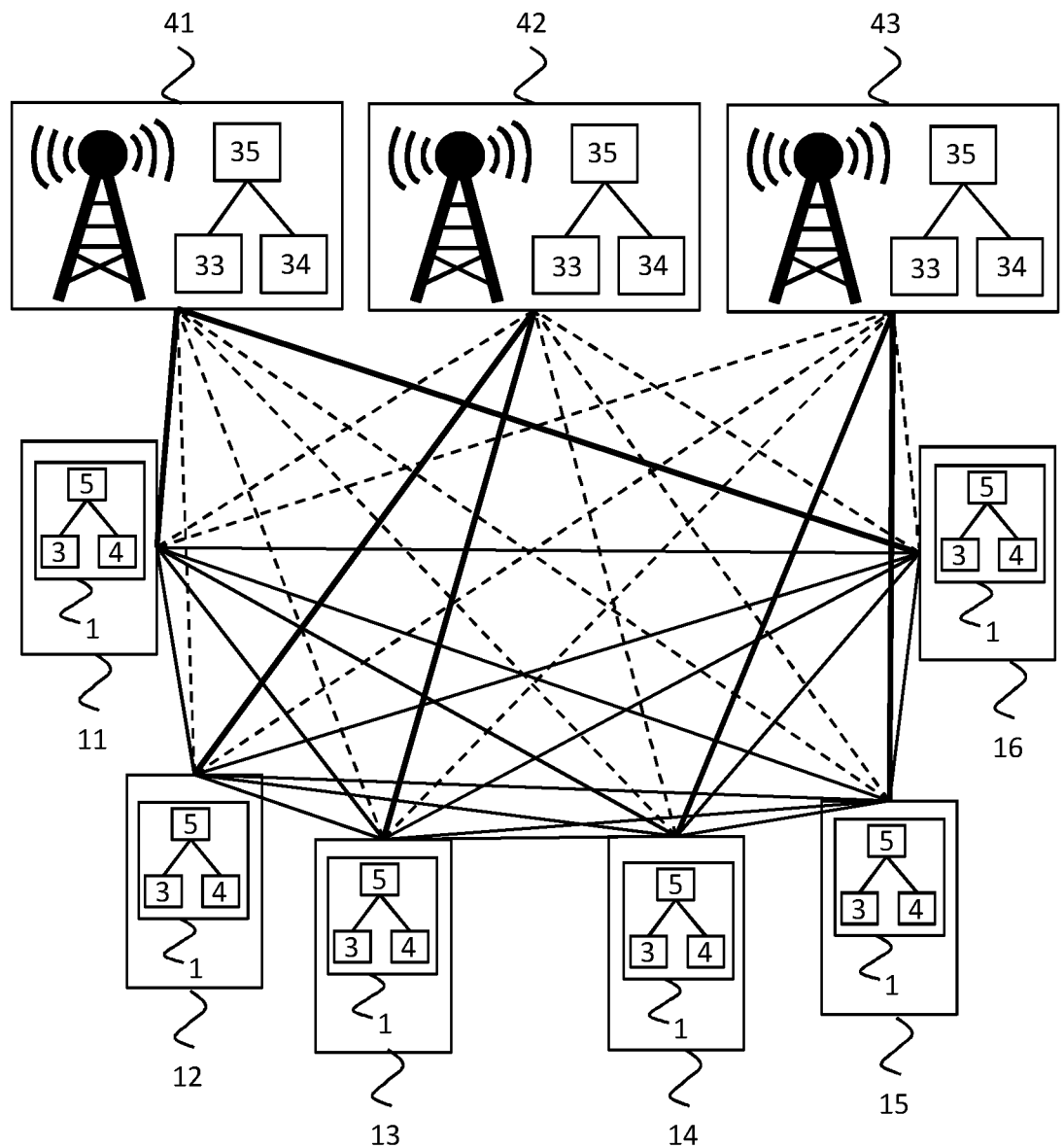
FIG. 3 is a block diagram of embodiments of the devices.

FIG. 3 is a block diagram of base stations 41-43 and vehicles 11-16 of FIG. 1. In the embodiment of FIG. 3, the base stations 41-43 are embodiments of the device for transmitting a regular and mini slot schedule and the vehicles 11-16 are embodiments of both the device for transmitting data and the device for receiving data. In the embodiment of FIG. 3, the base stations 41-43 do not transmit D2D data themselves. In an alternative embodiment, one or more of the base stations 41-43 are also an embodiment of the device for transmitting data and the device for receiving data. The vehicles 11-16 comprise a vehicle module 1. The vehicle module 1 comprises a processor 5, a receiver 3, and a transmitter 4.

In order to achieve low latency communication, the processor 5 of the vehicle module 1 is configured to use the receiver 3 to receive a regular slot schedule and a mini-slot schedule, use the transmitter 4 to transmit data of the first kind during a first part of a first time slot of a plurality of time slots of equal length according to the regular slot schedule, use the transmitter 4 to transmit a preamble in a second part of the first time slot, and use the transmitter 4 to transmit data of the second kind during one or more mini-slots of a first part of a second time slot of the plurality of time slots according to the mini-slot schedule. The second time slot succeeds the first time slot and the first part of the second time slot comprises a plurality of mini-slots.

The preamble indicates that data transmitted in the next time slot needs to be received with a low latency by a recipient of the data. The data of the first kind may comprise non-urgent data and the data of the second kind may comprise urgent data. This urgent data is also referred to as ultra-reliable low latency communication (URLLC) data and this preamble is also referred to as URLLC preamble in this description, although ultra-reliability is optional. LTE also uses the concept of "slots". In LTE, one subframe consists of two slots and corresponds to a Transmission Time Interval (TTI). The term "time slot" and "regular time slot" used in this specification may be an LTE slot or an LTE subframe, for example. The term "mini-slot" used in this specification may refer to part of an LTE slot or an LTE subframe, for example.

The processor 5 of the vehicle module 1 is further configured to use the receiver 3 to receive a regular slot schedule and a mini-slot schedule, use the receiver 3 to receive data of the first kind during a first part of a first time slot of a plurality of time slots of equal length according to the regular slot schedule, use the receiver 3 to receive a preamble in a second part of the first time slot, and use the receiver 3 to receive data during a plurality of mini-slots of a first part of a second time slot of the plurality of time slots according to the mini-slot schedule. The second time slot succeeds the first time slot.

The actual URLLC data will be transmitted by using mini-slots in the next (regular) time slot. The preamble thus also indicates that the receivers should switch to mini-slot mode for the reception of the URLLC data. Depending on the number of devices from the same operator in the cluster, a mini-slot schedule, i.e. a second transmission schedule based on mini-slots, is created that will only be used to transmit URLLC data by the devices of the particular operator in the cluster. This mini-slot schedule is transmitted (typically broadcast) in addition to the regular slot schedule. Thus, the receiving node will know where (which PRB) to listen as soon as it receives the preamble and that it needs to switch to mini-slot reception mode. The regular slot schedules and mini-slot schedules may be received over a shared (unlicensed) in a multi-operator scenario such as the one depicted in FIG. 3.

The invention is particularly advantageous in cases where traffic cannot be scheduled beforehand, e.g. if a UE has URLLC packets when an unexpected event take place (e.g. due to sudden braking). As the arrival of URLLC packets is unpredictable, such traffic should not be scheduled beforehand. Even if it could be scheduled by reserving resources, this will not be efficient as most of the time the reserved radio resources are not utilized as there is no actual URLLC traffic in the system. There are other types of URLLC applications in which devices generate periodic traffic that needs to be transmitted with low latency and with high reliability. Such traffic is preferably scheduled either in a regular fashion (by involving the base station) or by utilizing D2D communications with periodic resource reservation.

In the embodiment of FIG. 3, the processor 5 is configured to use the receiver 3 to receive the regular slot schedule and the mini-slot schedule from a base station or a cluster head. Typically, not only transmission of urgent data in the mini-slots is coordinated, but also transmission of the non-urgent data in the time slots is coordinated to avoid collisions of transmissions and a fair allocation of resources. This allocation may be made by a base station, e.g. in an 'in coverage' scenario, but may alternatively be made by a cluster head, i.e. one of vehicles 11-16.

In the example of FIG. 3, it is assumed that all UEs requiring D2D communication (including ones transmitting URLLC data) indicate their intention to use D2D communication to a base station of their operator, e.g. one of the base stations 41-43. The election of a cluster head makes it possible for the UEs to transmit and receive data without being connected to a base station all the time.

In the embodiment of FIG. 3, the base stations 41-43 are configured to provide the regular slot schedule and the mini-slot schedule to the vehicles 11-16. The base stations 41-43 comprises a processor 35, a receiver 33, and a transmitter 34. The processor 35 is configured to use the receiver 33 to receive information from a plurality of further devices, i.e. vehicles 11-16, and determine a regular slot schedule in which one or more time slots are allocated to a plurality of devices, i.e. vehicles 11-16, for transmission of data of a first kind on a frequency resource. The plurality of devices comprises the plurality of further devices.

The processor 35 of base station 41 is configured to receive information from vehicles 11 and 16 and determines a regular slot schedule for these vehicles. The processor 35 of base station 42 is configured to receive information from vehicles 12 and 13 and determines a regular slot schedule for these vehicles. The processor 35 of base station 43 is configured to receive information from vehicles 14 and 15 and determines a regular slot schedule for these vehicles.

The processor 35 is further configured to determine a mini-slot schedule in which one or more mini-slots of a time slot are allocated to each of the plurality of devices for transmission of data of a second kind on the frequency resource, and use the transmitter 34 to transmit the regular slot schedule and the mini-slot schedule to each of the plurality of further devices, i.e. vehicles 11-16. The time slot comprises a plurality of mini-slots.

Optionally, one or more of the vehicles 11-16 is capable of functioning as a cluster head instead of the base stations, either always or only in certain situations (e.g. out of coverage situations). In this case, the processor 5 of the vehicle module 1 is configured to use the receiver 3 to receive information from a plurality of further devices, e.g. from vehicles 12-16 if vehicle 11 is elected cluster head, and determine a regular slot schedule in which one or more time slots are allocated to a plurality of devices, i.e. vehicles 11-16, for transmission of data of a first kind on a frequency resource. The plurality of devices comprises the plurality of further devices.

The processor 5 is further configured to determine a mini-slot schedule in which one or more mini-slots of a time slot are allocated to each of the plurality of devices, i.e. to vehicles 11-16, for transmission of data of a second kind on the frequency resource and use the transmitter 4 to transmit the regular slot schedule and the mini-slot schedule to each of the plurality of further devices, e.g. to vehicles 12-16 if vehicle 11 is elected cluster head. The time slot comprises a plurality of mini-slots. If the time slots and mini-slots are allocated by one of the vehicles, it will typically allocate one or more time slots and mini-slots to itself.

The cluster head, for example, may make one or more regular slot schedules and one or more mini-slot schedules whenever some UEs are out of coverage of their operator. For example, when vehicles 11 and 16 (labelled A and F) are out of coverage of their operator, but vehicles 12 to 15 (labelled B to E) are in coverage of their respective operator, the regular slot and min-slot schedules for the operator that does not have coverage may be made by the cluster head and transmitted by the cluster head via a shared (unlicensed) channel, for example.

In the embodiment shown in FIG. 3, the vehicle module 1 comprises one processor 5. In an alternative embodiment, the vehicle module 1 comprises multiple processors. The receiver 3 and the transmitter 4 of the vehicle module 1 may use one or more cellular communication technologies such as GPRS, CDMA, UMTS, LTE, and/or 5G NR to communicate with base stations and other vehicles, for example. The receiver 3 and the transmitter 4 may be combined in a transceiver. The processor 5 may be a general-purpose processor, e.g. an ARM processor, or an application-specific processor. In the embodiment of FIG. 3, the vehicles 11-16 all comprise a vehicle module configured as described above, but the vehicle modules need not be identical, e.g. may be made by different manufacturers. In addition to the vehicle module 1, the vehicles 11-16 comprise components typical for a vehicle (not shown), e.g. an engine and tyres. The invention may also be used by other devices than vehicles.

In the embodiment shown in FIG. 3, the base stations 41-43 comprises one processor 35. In an alternative embodiment, one or more of the base stations 41-43 comprise multiple processors. The processor 35 of the base stations 41-43 may be a general-purpose processor, e.g. an Intel or an AMD processor, or an application-specific processor, for example. The processor 35 may comprise multiple cores, for example. The processor 35 may run a Unix-based or Windows operating system, for example.

The receiver 33 and the transmitter 34 may use one or more cellular communication technologies such as GPRS, CDMA, UMTS, LTE and/or 5G/NR to communicate with UEs (e.g. vehicles 11-16), for example. The receiver 33 and the transmitter 34 may be combined in a transceiver. Base stations 41-43 may comprise other components typical for a component in a (e.g. mobile) communication network, e.g. a power supply. In the embodiment shown in FIG. 3, the base stations 41-43 comprises one device. In an alternative embodiment, one or more of the base stations 41-43 comprise a plurality of devices.

FIGS. 1 to 3 describe an example scenario in which UEs of multiple operators are part of the same group and the UEs and base stations of FIG. 3 can support such a scenario. The UEs and base stations of FIG. 3 can also support a single-operator scenario. In an alternative embodiment, one or more of the UEs and base stations, e.g. all UEs and base stations, can only support a single-operator scenario, e.g. because a shared channel has not been allocated.

Figure 4:
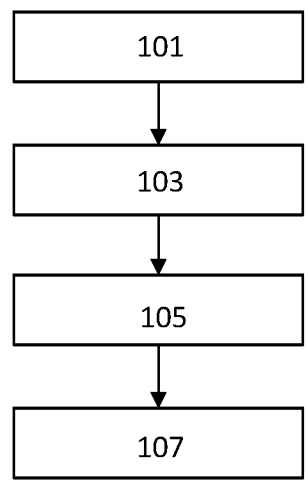
FIG. 4 is a flow diagram of a first embodiment of the method of transmitting data.

A first embodiment of the method of transmitting data of a first kind and data of a second kind is shown in FIG. 4. A step 101 comprises receiving a regular slot schedule and a mini-slot schedule. A step 103 comprises transmitting data of the first kind during a first part of a first time slot of a plurality of time slots of equal length according to the regular slot schedule. A step 105 comprises transmitting a preamble in a second part of the first time slot. A step 107 comprises transmitting data of the second kind during one or more mini-slots of a first part of a second time slot of the plurality of time slots according to the mini-slot schedule.

The second time slot succeeds the first time slot and the first part of the second time slot comprises a plurality of mini-slots.

Figure 5:
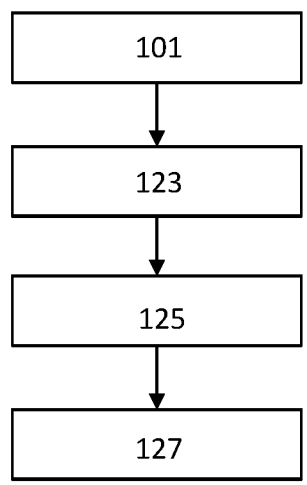
FIG. 5 is a flow diagram of a first embodiment of the method of receiving data.

A first embodiment of the method of receiving data of a first kind and data of a second kind is shown in FIG. 5. Step 101 comprises receiving a regular slot schedule and a mini-slot schedule. A step 123 comprises receiving data of the first kind during a first part of a first time slot of a plurality of time slots of equal length according to the regular slot schedule. A step 125 comprises receiving a preamble in the first time slot. A step 127 comprises receiving data during a plurality of mini-slots of a first part of a second time slot of the plurality of time slots according to the mini-slot schedule. The second time slot succeeds the first time slot.

Figure 6:
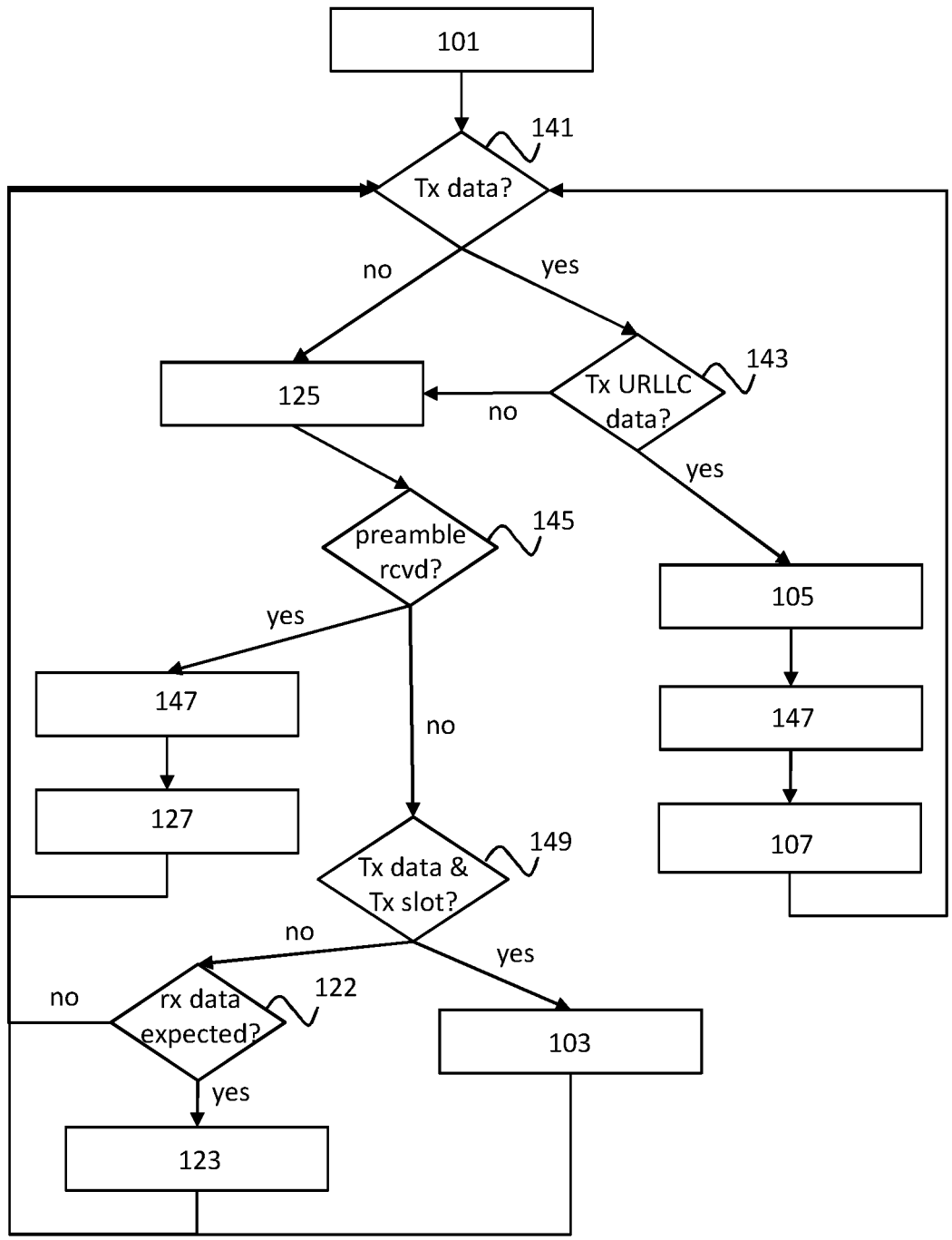
FIG. 6 is a flow diagram of a second embodiment of the methods of transmitting and receiving data.

A second embodiment of the methods of transmitting and receiving data is shown in FIG. 6. The method of FIG. 6 may be performed, for example, by the UEs of FIG. 3, which both transmit and receive data of a first kind and data of a second kind. Step 101 comprises receiving a regular slot schedule and a mini-slot schedule.

In step 141, it is determined whether the device has any data to be transmitted. If the device has data to be transmitted, step 143 is performed next. If not, step 125 is performed. In the embodiment of FIG. 6, data has been classified in one of a plurality of classes. The class of the data to be transmitted is checked in step 143. If the device has URLLC data to be transmitted, then step 105 is performed next.

In step 105, a preamble is transmitted in a second part of the current time slot. A step 147 comprises switching to mini-slot mode for transmission in the next time slot. Step 107 comprises transmitting the URLLC data during one or more mini-slots of a first part of this next time slot according to the mini-slot schedule. The first part of this next time slot comprises a plurality of mini-slots. After step 107, the mini-slot mode is exited and step 141 is repeated.

If the device has non-URLLC data to transmit, the URLLC preamble is not transmitted, but step 125 is performed after step 143. In step 125, the device listens for transmission of the URLLC preamble in the second part of the current time slot and receives the URLLC preamble transmitted by any other device. Step 145 comprises checking whether the device has received a preamble in step 125. If the device has received a preamble, steps 147 and 127 are performed next. If not, then step 149 is performed next.

Step 147 comprises switching to mini-slot mode for reception in the next time slot. Step 127 comprises receiving URLLC data during a plurality of mini-slots of a first part of this next time slot according to the mini-slot schedule. If the device has non-URLLC data to transmit, then it does not transmit this data in the next time slot, i.e. refrains from transmitting in the next time slot. After step 127, the mini-slot mode is exited and step 141 is repeated.

In step 149, it is determined whether the device has (non-URLLC) data to be transmitted and whether the next time slot has been allocated to it (according to the regular slot schedule). If so, then a step 103 is performed. If not, then a step 122 is performed. Step 103 comprises transmitting the (non-URLLC) data during a first part of the next time slot. Step 122 comprises checking whether the next time slot is scheduled for receiving data (according to the regular slot schedule). If not, then step 141 is repeated. If the device expects to receive data, a step 123 is performed next. Step 123 comprises receiving non-URLLC data during a first part of the next time slot, normally from the device to which the next time slot has been allocated. Step 141 is repeated after step 123.

Figure 7:
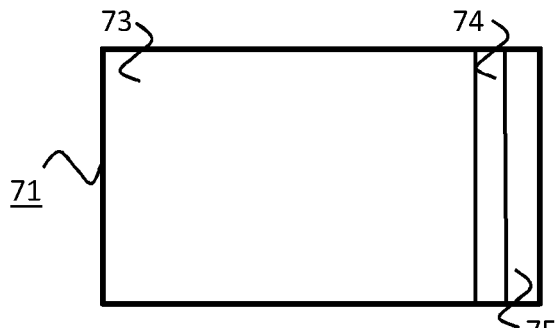
FIG. 7 shows an example of a frame format used by devices for transmitting and receiving data in a first embodiment.

FIG. 7 shows an example of a time slot format used by devices for transmitting and receiving data in a first embodiment. The time-slot 71 comprises a first part 73 for transmitting data and a second part 74 for transmitting a preamble. The preamble typically indicates that data transmitted in the next time slot requires urgent, i.e. low latency, reception by one or more recipients of the data. For example, the preamble may be an URLLC flag and/or may be transmitted in a time slot reserved specifically for URLLC preambles. This may be standardized, e.g. in a 3GPP standard. Preferably, the second part 74 consumes 15% or less of a time slot.

The URLLC flag will be transmitted just before the start of the URLLC data transmission i.e. in the slot before the actual URLLC transmission slot. This means the actual transmission opportunity in every regular time slot will not be filled completely with regular data transmission in order to allow possible URLLC flag transmission.

In the example of FIG. 7, the time-slot 71 additionally comprises a guard interval 75, which follows the second part 74. The guard interval 75 helps devices to process the preamble and decide whether to transmit or not in the next time slot. In an alternative time-slot format, the guard interval 75 is omitted.

Figure 8:
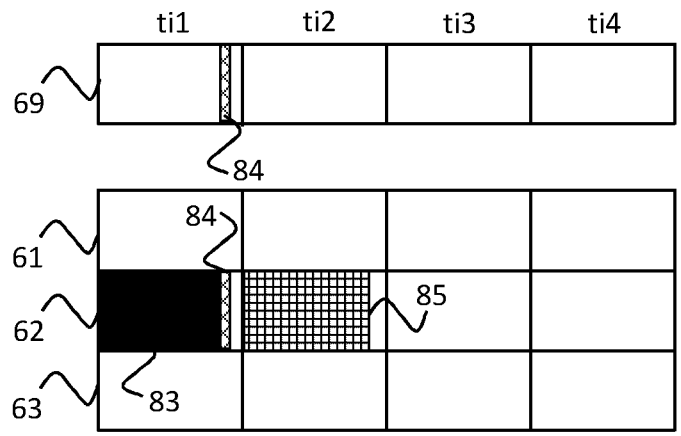
FIG. 8 exemplifies the usage of the frame format of FIG. 7.

FIG. 8 exemplifies the usage of the time-slot format of FIG. 7. On the y axis, three operator-specific D2D channels (frequency resources) 61-63 with different carrier frequencies and a shared control channel (frequency resource) 69 are represented. The shared control channel 69 is shared by multiple mobile network operators. On the x axis, four time slots ti1-ti4 are represented. In the example of FIG. 8, the operator-specific D2D channels 61-63 are uplink resources reserved for D2D communication.

In the example of FIG. 8, a first UE transmits (non-urgent) non-URLLC data 83 in the first part of time slot ti1 on channel 62 according the regular slot schedule. Then, the first UE or a second UE transmits an URLLC preamble 84, e.g. a flag, both on channel/frequency carrier 62 and shared control channel 69. After receiving the preamble on the operator specific D2D channel 62 or on the shared control channel 69, all the UEs from that particular operator will postpone their scheduled transmission of non-urgent data (if any has been scheduled to be transmitted on the operator specific D2D channel 62) in the next time slot.

The UE that transmitted the URLLC preamble 84 then switches to mini-slot mode and transmits URLLC data (i.e. urgent data) in one or more of the mini-slots 85 in the first part of time slot ti2 according to the mini-slot schedule. The non-urgent (non-URLLC) data takes up more than half of the time slot ti1.

The URLLC preamble 84 is detected by other UEs in proximity (including the ones that do not require D2D URLLC communication). The preamble 84 indicates that the UE will attempt an URLLC transmission in the next time slot. The URLLC preamble 84 is followed directly by a guard interval, as shown in FIG. 7. The guard interval marks the end of the time slot. The inclusion of the preamble and guard interval in the time slot ti1 also means that the payload of the URLLC D2D data transmission in the succeeding time slot ti2 has to be slightly shorter than the total time interval length in order to have space for transmission of a next URLLC preamble either by the same UE or by another UE requiring URLLC transmission.

D2D UEs with non-URLLC data first have to listen for transmission of an URLLC preamble before the start of the intended/scheduled time slot. The D2D UEs having non-URLLC data only transmit in the uplink frequency resources reserved for D2D communication if they do not receive a URLLC preamble. The UEs with non-URLLC data will transmit this data (whenever allowed) without transmitting a preamble first, unlike the UEs with URLLC data.

In addition to being used for transmitting preambles, the shared control channel 69 may also be used for exchanging cluster formation-related messages, slot schedules (regular slot schedules and/or mini-slot schedules) and/or other control signaling messages between the base station (or cluster head in the "out of coverage' scenario) and the vehicles associated with a cluster. For example, the regular slot schedule and/or the mini-slot schedule may be transmitted on the shared control channel 69.

In the example of FIG. 8, the preamble 84 is transmitted concurrently on two different frequency resources having different carrier frequencies. This allows the first UE to immediately after transmitting the non-URLLC data 83 to start listening for preambles transmitted by other UEs. Since it typically takes some time to switch from transmission mode to reception mode, the first UE might not able to receive the preamble 84 transmitted on channel 62 by a second UE. The preamble 84 transmitted on shared control channel 69 helps the first UE learn of the upcoming URLLC transmission.

The preamble 84 transmitted by a UE on the different frequency resource, i.e. the shared control channel 69, may identify the frequency resource used by the UE to transmit the URLLC data on in the next time slot. This informs UEs receiving the preamble 84 on which (other) frequency resource the UE will transmit its URLLC data in the next time slot and allows these UEs to refrain from transmitting on this frequency resource in the next time slot and/or receive the URLLC data transmitted in the mini-slots of the next time slot.

The UE that transmits the preamble 84 may learn which preamble it needs to transmit based on a received preamble assignment. This preamble assignment may be transmitted by a base station or cluster head, for example. This preamble assignment assigns a preamble to a UE and may comprise assignments of preambles to all UEs transmitting on the same frequency resource or to all UEs in the same cluster, for example. The preamble may be selected by the base station or cluster head from a plurality of orthogonal preambles.

The use of orthogonal preambles allows different UEs to concurrently transmit preambles in the same time slot on the same frequency resource (i.e. in the same PRB), e.g. on the shared control channel 69, and still receive all preambles. For example, preamble transmissions can be the Zadoff-Chu sequences (see https://en.wikipedia.org/wiki/Zadoff-Chu_sequence) or sending a coded version of a preamble index. For example, an 8-bit preamble index that is coded such that overlapping transmissions can be distinguished by the receivers. In this case, there could be up to $2^8=256$ different preamble indexes transmitted simultaneously.

In the example of FIG. 8, each of channels 61-63 is exclusively used by a different mobile network operator. The above-mentioned first UE transmits data on a channel 62, but the first UE is able to receive data on any of the channels 61-63. For example, a cluster of vehicles typically comprises vehicles that use different mobile network operators and the vehicles typically need to be able to receive data transmitted by all vehicles in the cluster and therefore also on frequency resources used exclusively by other mobile network operators.

Figure 9:
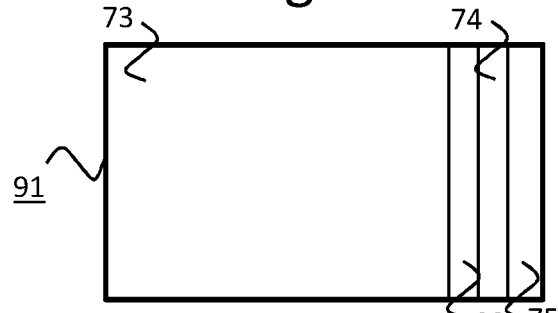
FIG. 9 shows an example of a frame format used by devices for transmitting and receiving data in a second embodiment.

FIG. 9 shows an example of a time slot format used by devices for transmitting and receiving data in a second embodiment. In this second example, a time slot 91 comprise comprises a first part 73 for transmitting data, a second part 74 for transmitting a preamble, a guard interval 75 after the second part 74 and a further guard interval 93 between the first part 73 and the second part 74.

This further guard interval 93 allows the first UE to listen for preambles transmitted by other UEs on a frequency resource with the same carrier frequency as the frequency resource on which the UE has just transmitted its data. In this case, it is not necessary to concurrently transmit the preamble in two different frequency resources having different carrier frequencies.

Figure 10:
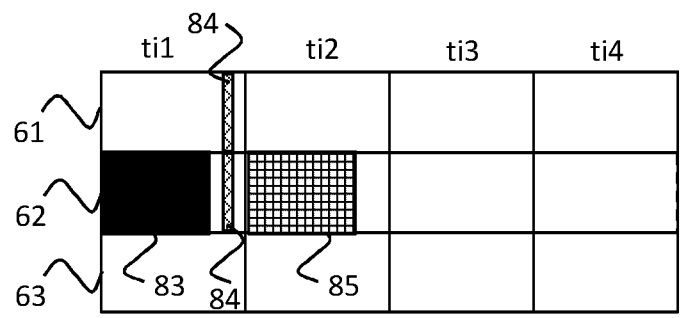
FIG. 10 exemplifies the usage of the frame format of FIG. 9.

FIG. 10 exemplifies the usage of the time slot format of FIG. 9. The first UE that transmits the non-urgent data 62 and the preamble 84 in ti1 waits a guard interval after transmitting the non-urgent date 62 before transmitting the preamble 84. Like in the example of FIG. 8, the UE that transmitted the preamble 84 then switches to mini-slot mode and transmits urgent data in one or more of the mini-slots 85 in the first part of time slot ti2 according to the mini-slot schedule.

In the example of FIG. 10, the channels 61-63 belong to the same operator and the first UE that transmitted the non-urgent data 62, or alternatively a second UE, transmits the preamble 84 on both channels 61 and 62. Transmitting the preamble 84 on channel 61 is optional and increases preamble reception probability.

If an operator assigns sufficient resources for vehicular communication (assuming same spectrum is shared among different vertical applications), no collision will take place during URLLC data transmissions by different devices as the devices will select different PRBs to transmit URLLC data in most of the cases. However, in resource constraint situation, multiple devices may need to transmit URLLC data on the same PRB (i.e. in the same frequency resource in the same time slot) due to the urgency of the message and lack of concurrent resources (PRBs). The mini-slot schedule addresses such situations in the following manner.

If the number of UEs that is present in the cluster from a certain operator is smaller than the (maximum possible) mini-slots in a regular slot, each of the UEs will be assigned to at least one, and if possible multiple, mini-slot(s) for their possible URLLC data transmission.

On the other hand, if more UEs from a certain operator are present in the cluster than the number of (maximum possible) mini-slots in a regular slot, different combinations (e.g. a pair or trio) of UEs will be assigned to the same mini-slot according to an anti-collision minslot (transmission) schedule to enable time-critical communications. The combinations are preferably made in such a way that a device is scheduled in multiple mini-slots always with a different device so that the probability of collision is minimized.

Figure 11:
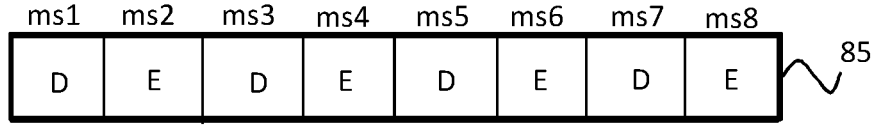
FIG. 11 shows a first example of a mini-slot schedule.

FIG. 11 shows a first example of a mini-slot schedule for the mini-slots 85 of FIGS. 8 and 10. In the example of FIG. 11, eight mini-slots are represented and each of the mini-slots is allocated exclusively to one device. Such an allocation may be made if the number of devices that transmits on a frequency resource is equal to or smaller than the number of available mini-slots.

Regularly, multiple devices have urgent data to transmit at the same time, e.g. in case of simultaneous braking and/or when a (near) collision occurs. When these multiple devices use the same operator, they may be allocated mini slots in the same mini-slot schedule. In certain situations, data transmitted by other devices is of interest to a device and this device will thus want to receive this data. Therefore, in addition to transmitting urgent data in one or more of the mini-slots, a device may be able to receive urgent data from another device in one or more of the mini-slots. The device typically not only wants to receive urgent data in the mini-slots of his own operator's frequency resource(s), but also in the mini-slots of other operators.

In the example of FIG. 11, urgent data of a single device may be transmitted over multiple mini-slots. By transmitting urgent data over multiple mini-slots, a higher throughput may be achieved. This is beneficial if multiple mini-slots are allocated to a single device and the urgent data from this device does not fit into one mini-slot. Such an allocation may be made if the number of devices that transmits on a frequency resource is smaller than the number of mini-slots.

Alternatively, urgent data may be transmitted a first time in a first one of the mini-slots and one or more further times in one or more further ones of the mini-slots. Such a duplication of the data of the second kind in multiple mini-slots increases the reliability of the transmission and may be used, for example, when the number of devices that transmits on a frequency resource is smaller than the number of mini-slots.

In the example of FIG. 11, eight mini-slots are allocated to two devices. Mini-slots 1, 3, 5 and 7 are allocated to car 14 (labelled "D") of FIG. 1. Mini-slots 2, 4, 6 and 8 are allocated to car (labelled "E") of FIG. 1.

Figure 12:
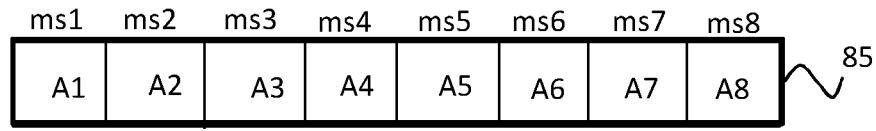
FIG. 12 shows a second example of a mini-slot schedule.

FIG. 12 shows a second example of a mini-slot schedule for the mini-slots 85 of FIGS. 8 and 10. In the example of FIG. 12, exactly one mini-slot is allocated to each device, as the number of mini-slots equals the number of devices transmitting data on this channel. In the example of FIG. 12, mini-slots 1-8 are allocated to devices A1-A8, respectively.

Figure 13:
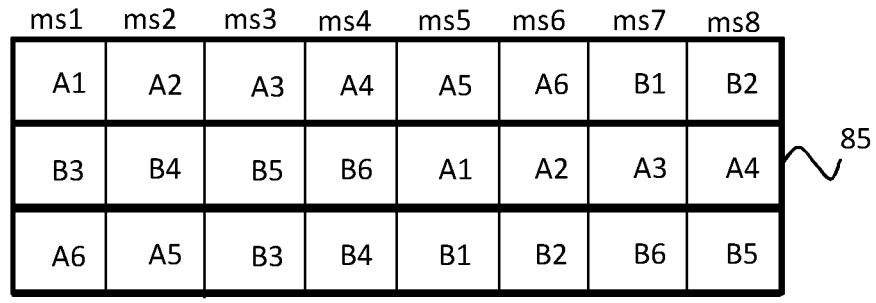
FIG. 13 shows a third example of a mini-slot schedule.

FIG. 13 shows a third example of a mini-slot schedule for the mini-slots 85 of FIGS. 8 and 10. In the example of FIG. 13, the number of devices that transmits on a frequency resource, which is 12, is larger than the number of mini-slots, which is 8. Therefore, each mini-slot is allocated to multiple devices. Furthermore, the urgent data is transmitted a first time in a first one of the mini-slots and one or more further times in one or more further ones of the mini-slots. In this case, the duplication of the data of the urgent data in multiple mini-slots is used to increase the correct reception of the second kind of data when two devices are transmitting simultaneously in the same mini-slot but there is no transmission overlap of the duplicated data transmitted in another mini-slot. This mini-slot schedule is therefore referred to as an anti-collision mini-slot schedule.

In the example of FIG. 13, each mini-slot is allocated to three devices and each device is allocated two mini-slots. Mini-slots 1 and 5 are allocated to device A1, mini-slots 2 and 6 are allocated to device A2, mini-slots 3 and 7 are allocated to device A3, mini-slots 3 and 8 are allocated to device A4, mini-slots 2 and 5 are allocated to device A5, and mini-slots 1 and 6 are allocated to device A6. Mini-slots 5 and 7 are allocated to device B1, mini-slots 6 and 8 are allocated to device B2, mini-slots 1 and 3 are allocated to device B3, mini-slots 2 and 4 are allocated to device B4, mini-slots 3 and 8 are allocated to device B5, and mini-slots 4 and 7 are allocated to device B6.

Thus, if device A1 and A6 have URLLC packets to transmit and they both choose the same PRB for the transmission, the transmissions will collide on mini-slot 1. However, device A1 will succeed in mini-slot 5 and device A6 will succeed in mini-slot 6, as they were paired in those mini-slots with other devices which fortunately do not have URLLC data to transmit (or which have chosen different frequency resources/carriers for the transmission). Such a mini-slot schedule reduces the probability of collisions in case of simultaneous URLLC transmissions from the devices of the same operator on the same PRB.

Depending on the size of the URLLC data, a particular UE might need more than one mini-slot to complete its transmission. Depending on the mini-slot schedule, the UE will use one of the following approaches to complete its URLLC data transmission.

If there is more than one transmission opportunity for a particular UE in the mini-slot schedule (as shown in FIG. 11), the UE will multiplex its data into those mini-slots. If the available (and scheduled) mini-slots are not enough to transmit the complete URLLC data of the UE, it will keep transmitting preambles and claiming the next time slots until it has finished transmitting the complete URLLC data.

If the anti-collision schedule is used for second transmission schedule (as shown in FIG. 13), the UE will not multiplex URLLC data in the mini-slots (of the current time slot), but instead, it will keep transmitting preambles and claiming the next time slots until it has finished transmitting the complete URLLC data.

Note that the anti-collision schedule cannot avoid collisions when the network becomes too congested. In such situations, new clusters may be formed to increase the reliability of the communications. Depending on the number of (maximum possible) mini-slots in a (regular) time slot, a threshold can be determined which can be used to limit number of UEs (e.g. vehicles) from a particular operator in the cluster.

The above-described methods may be extended to (further) increase the reliability of the communication. This may be realized, for example, by transmitting the URLLC data on two frequency resources. The URLLC data may be transmitted on two uplink frequency resources reserved for D2D communication or on one uplink frequency resource reserved for D2D communication and one downlink frequency resource, for example. Typically, a fixed association between the two frequency resources is pre-configured.

Figure 14:
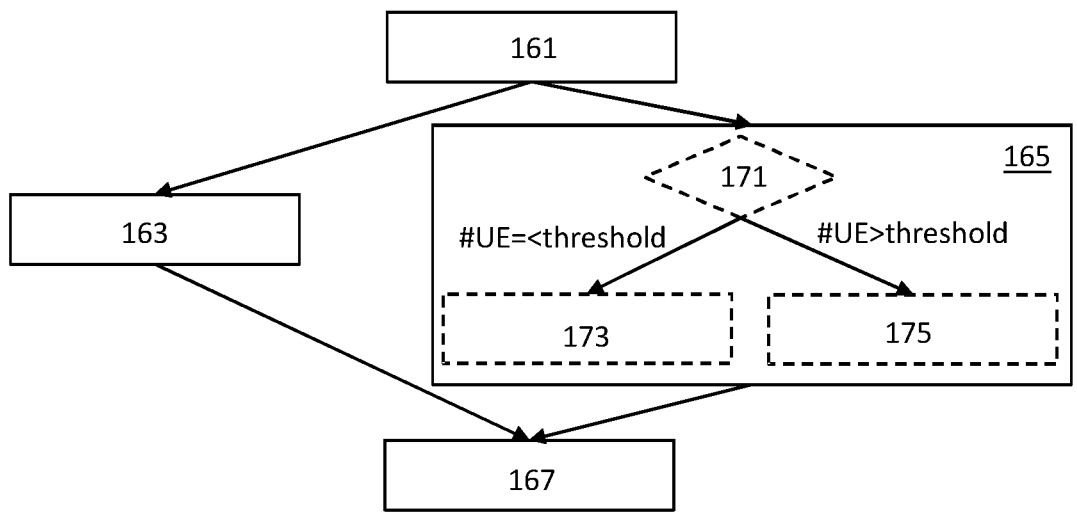
FIG. 14 is a flow diagram of an embodiment of the method of transmitting a slot schedule.

An embodiment of the method of transmitting a slot schedule is shown in FIG. 14. A step 161 comprises receiving information from a plurality of further devices, e.g. their identities and/or locations. Steps 163 and 165 are performed after step 161. Step 163 comprises determining a regular slot schedule in which one or more time slots are allocated to a plurality of devices for transmission of data of a first kind on a frequency resource. The plurality of devices comprises the plurality of further devices.

A step 165 comprises determining a mini-slot schedule in which one or more mini-slots of a time slot are allocated to each of the plurality of devices for transmission of data of a second kind on the frequency resource. This time slot comprises a plurality of mini-slots. In the embodiment of FIG. 14, steps 163 and 165 are performed at least partly in parallel. In an alternative embodiment, step 163 is performed before or after step 165.

The length (i.e. duration) of available mini-slots may be $\frac{1}{8}^{th}$, $\frac{1}{4}^{th}$ or half of a regular time slot (or of the part for transmitting user data thereof), for example. The length and number of available mini-slots may be standardized. The device that makes the mini-slot allocation may be able to choose the number of available mini-slots from a plurality of pre-defined choices, e.g. increase the number of available mini-slots (up to a certain maximum), in dependence on a count of devices that need to transmit on the frequency resource.

Step 165 may comprise sub steps 171, 173 and 175. Step 171 comprises determining whether a count of the plurality of devices exceeds a threshold. Step 173 comprises allocating one or more of the mini-slots to each of the plurality of devices upon determining that the count does not exceed the threshold. The threshold may be based on the number of mini-slots, for example. In step 173, each of the plurality of mini-slots is allocated to only one device. Step 175 comprises allocating multiple of the plurality of mini-slots to each of the plurality of devices upon determining that the count exceeds the threshold. In step 175, each of the mini-slots is allocated to multiple devices.

A step 167 is performed after steps 163 and 165 have been performed. Step 167 comprises transmitting the regular slot schedule and the mini-slot schedule to each of the plurality of further devices.

Figure 15:
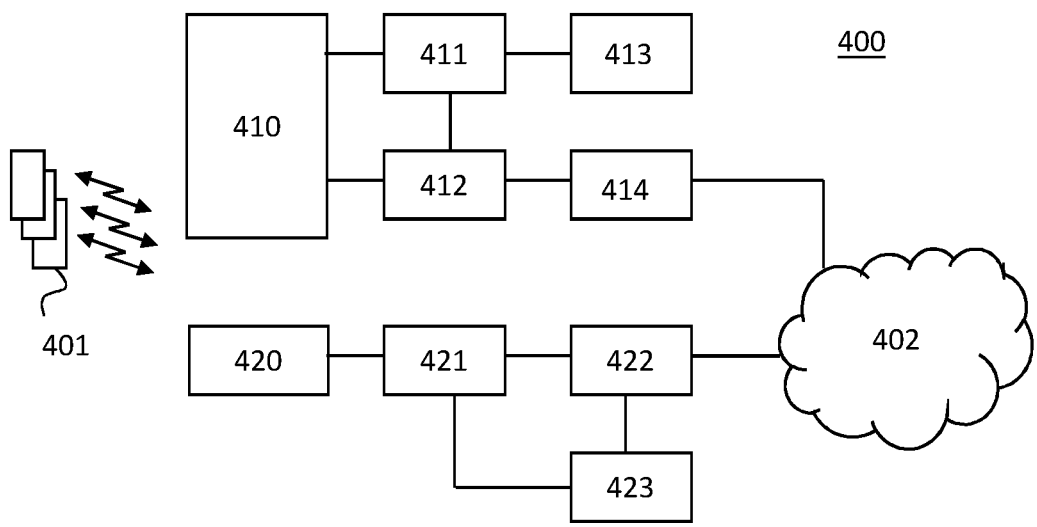
FIG. 15 is a block diagram of an exemplary cellular telecommunication system used in an embodiment of the device and the system of the invention.

In the telecommunications system 400 of FIG. 15, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 15 represents a GSM/GPRS or UMTS network.

For a GSM/GPRS network, a radio access network (RAN) system 420 comprises a plurality of nodes, including base stations (combination of a BSC and a BTS), not shown individually in FIG. 15. The core network system comprises a Gateway GPRS Support Node 422 (GGSN), a Serving GPRS Support Node 421 (SGSN, for GPRS) or Mobile Switching Centre (MSC, for GSM, not shown in FIG. 15) and a Home Location Register 423 (HLR). The HLR 423 contains subscription information for user devices 401, e.g. mobile stations MS.

For a UMTS radio access network (UTRAN), the radio access network system 420 also comprises a Radio Network Controller (RNC) connected to a plurality of base stations (NodeBs), also not shown individually in FIG. 15. In the core network system, the GGSN 422 and the SGSN 421/ MSC are connected to the HLR 423 that contains subscription information of the user devices 401, e.g. user equipment UE.

The upper branch of the telecommunications system in FIG. 15 represents a 4G network, commonly indicated as Long Term Evolution (LTE) system or Evolved Packet System (EPS).

The radio access network system 410 (E-UTRAN) of the EPS, comprises base stations (evolved NodeBs, eNodeBs or eNBs), not shown individually in FIG. 15, providing cellular wireless access for a user device 401, e.g. user equipment UE. The core network system comprises a PDN Gateway (P-GW) 414 and a Serving Gateway 412 (S-GW). The E-UTRAN 410 of the EPS is connected to the S-GW 412 via a packet network. The S-GW 412 is connected to a Home Subscriber Server HSS 413 and a Mobility Management Entity MME 411 for signalling purposes. The HSS 413 includes a Subscription Profile Repository SPR for user devices 401.

For GPRS, UMTS and LTE systems, the core network system is generally connected to a further packet network 402, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 16:
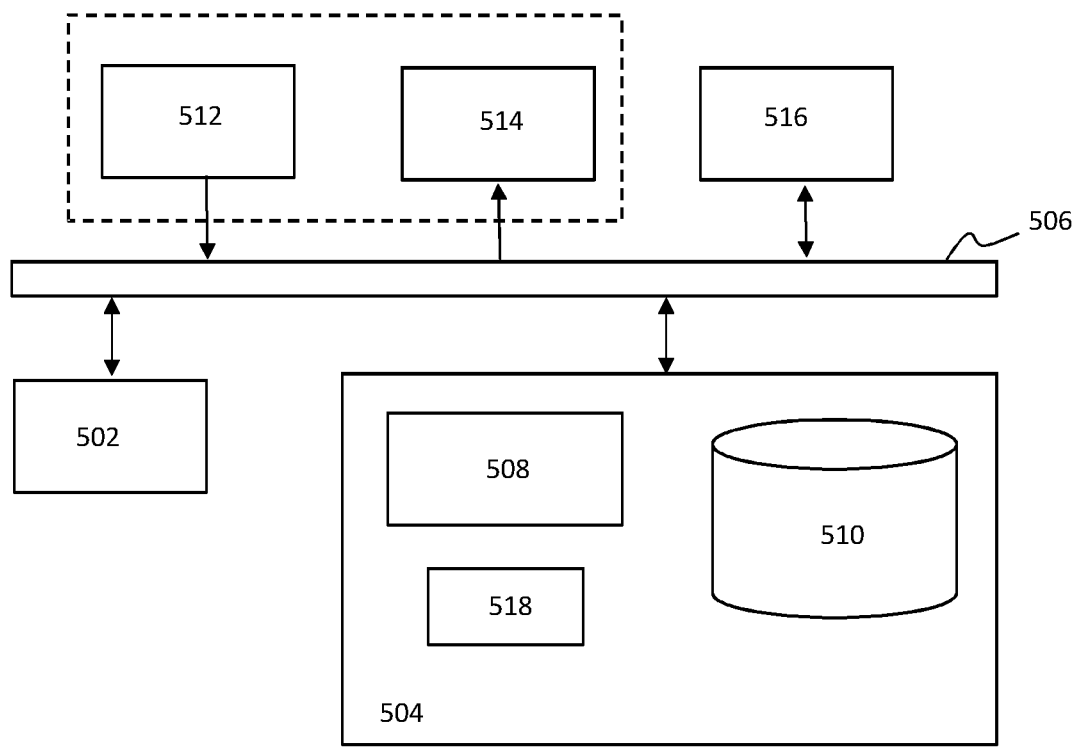
FIG. 16 is a block diagram of an exemplary data processing system for performing the methods of the invention.

FIG. 16 depicts a block diagram illustrating an exemplary data processing system that may perform the methods as described with reference to FIGS. 4 to 6 and FIG. 14.

As shown in FIG. 16, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

Input/output (I/O) devices depicted as an input device 512 and an output device 514 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 16 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 16, the memory elements 504 may store an application 518. In various embodiments, the application 518 may be stored in the local memory 508, he one or more bulk storage devices 510, or separate from the local memory and the bulk storage devices. It should be appreciated that the data processing system 500 may further execute an operating system (not shown in FIG. 16) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A device for transmitting data of a first kind and data of a second kind, said data of the first kind comprising non-urgent data and said data of the second kind comprising urgent data, comprising:
   at least one receiver;
   at least one transmitter; and
   at least one processor configured to:
   use said at least one receiver to receive a regular slot schedule and a mini-slot schedule,
   use said at least one transmitter to transmit data of said first kind during a first part of a first time slot of a plurality of time slots of equal length according to said regular slot schedule,
   use said at least one transmitter to transmit a preamble in a second part of said first time slot, the preamble indicating that data transmitted in the next time slot requires urgent reception, and
   use said at least one transmitter to transmit data of said second kind during one or more mini-slots of a first part of a second time slot of said plurality of time slots according to said mini-slot schedule, said second time slot succeeding said first time slot and said first part of said second time slot comprising a plurality of mini-slots.

2. The device as claimed in claim 1, wherein said at least one processor is configured to concurrently transmit said preamble in said second part of said first time slot on two different frequency resources, said two different frequency resources having different carrier frequencies.

3. The device as claimed in claim 1, wherein said at least one processor is configured to wait during at least a guard interval after transmitting said data of said first kind before transmitting said preamble.

4. The device as claimed in claim 1, wherein said at least one processor is configured to use said at least one transmitter to transmit data of said second kind over multiple mini-slots of said first part of said second time slot.

5. The device as claimed in claim 1, wherein said at least one processor is configured to transmit said data of said second kind a first time in a first one of said mini-slots and one or more further times in one or more further ones of said mini-slots.

6. The device as claimed in claim 1, wherein said at least one processor is configured to use said at least one receiver to receive further data of said second kind from one or more further devices during one or more further mini-slots of said first part of said second time slot on a frequency resource used by said at least one processor to transmit said data of said second kind.

7. The device as claimed in claim 1, wherein said at least one processor is configured to transmit said data of said second kind on a first frequency resource, said first frequency resource being used exclusively by a first mobile network operator, and receive other data on another frequency resource, said other frequency resource being used exclusively by a second mobile network operator.

8. The device as claimed in claim 1, wherein said at least one processor is configured to use said at least one receiver to receive a preamble assignment, said preamble assignment assigning said preamble to said device, said preamble being selected from a plurality of orthogonal preambles.

9. A device for receiving data of a first kind and data of a second kind, said data of the first kind comprising non-urgent data and said data of the second kind comprising urgent data, comprising:
   at least one receiver; and
   at least one processor configured to:
   use said at least one receiver to receive a regular slot schedule and a mini-slot schedule,
   use said at least one receiver to receive data of said first kind during a first part of a first time slot of a plurality of time slots of equal length according to said regular slot schedule, use said at least one receiver to receive a preamble in a second part of said first time slot, the preamble indicating that data transmitted in the next time slot requires urgent reception, and use said at least one receiver to receive data during a plurality of mini-slots of a first part of a second time slot of said plurality of time slots according to said mini-slot schedule, said second time slot succeeding said first time slot.

10. A device for transmitting a slot schedule, comprising:
at least one receiver;
at least one transmitter; and
at least one processor configured to:
   use said at least one receiver to receive information from a plurality of further devices,
   determine a regular slot schedule in which one or more time slots are allocated to a plurality of devices for transmission of data of a first kind on a frequency resource, said plurality of devices comprising said plurality of further devices, said data of the first kind comprising non-urgent data,
   determine a mini-slot schedule in which one or more mini-slots of a time slot are allocated to each of said plurality of devices for transmission of data of a second kind on said frequency resource, said time slot comprising a plurality of mini-slots, said data of the second kind comprising urgent data, and
   use said at least one transmitter to transmit said regular slot schedule and said mini-slot schedule to each of said plurality of further devices.

11. The device as claimed in 10, wherein said at least one processor is configured to:
   determine whether a count of said plurality of devices exceeds a threshold,
   allocate one or more of said plurality of mini-slots to each of said plurality of devices upon determining that said count does not exceed said threshold, each of said plurality of mini-slots being allocated to only one device, and
   allocate multiple of said plurality of mini-slots to each of said plurality of devices upon determining that said count exceeds said threshold, each of said plurality of mini-slots being allocated to multiple devices.

12. A method of transmitting data of a first kind and data of a second kind, said data of the first kind comprising non-urgent data and said data of the second kind comprising urgent data, comprising:
   receiving a regular slot schedule and a mini-slot schedule;
   transmitting data of said first kind during a first part of a first time slot of a plurality of time slots of equal length according to said regular slot schedule;
   transmitting a preamble in a second part of said first time slot, the preamble indicating that data transmitted in the next time slot requires urgent reception; and
   transmitting data of said second kind during one or more mini-slots of a first part of a second time slot of said plurality of time slots according to said mini-slot schedule, said second time slot succeeding said first time slot and said first part of said second time slot comprising a plurality of mini-slots.

13. A method of receiving data of a first kind and data of a second kind, said data of the first kind comprising non-urgent data and said data of the second kind comprising urgent data, comprising:
   receiving a regular slot schedule and a mini-slot schedule;
   receiving data of said first kind during a first part of a first time slot of a plurality of time slots of equal length according to said regular slot schedule;
   receiving a preamble in said first time slot, the preamble indicating that data transmitted in the next time slot requires urgent reception; and
   receiving data during a plurality of mini-slots of a first part of a second time slot of said plurality of time slots according to said mini-slot schedule, said second time slot succeeding said first time slot.

14. A method of transmitting a slot schedule, comprising:
   receiving information from a plurality of further devices;
   determining a regular slot schedule in which one or more time slots are allocated to a plurality of devices for transmission of data of a first kind on a frequency resource, said data of the first kind comprising non-urgent data, said plurality of devices comprising said plurality of further devices;
   determining a mini-slot schedule in which one or more mini-slots of a time slot are allocated to each of said plurality of devices for transmission of data of a second kind, said data of the second kind comprising urgent data, on said frequency resource, said time slot comprising a plurality of mini-slots; and
   transmitting said regular slot schedule and said mini-slot schedule to each of said plurality of further devices.

15. A non-transitory computer-readable medium having instructions stored thereon, the instructions, when run on a computer system, being configured for performing the method of claim 12.

16. A non-transitory computer-readable medium having instructions stored thereon, the instructions, when run on a computer system, being configured for performing the method of claim 13.

17. A non-transitory computer-readable medium having instructions stored thereon, the instructions, when run on a computer system, being configured for performing the method of claim 14.

* * * * *